3,296,093
METHOD OF PRODUCING 10α-METHYL STEROIDS WITH SEPEDONIUM SPECIES
Jan de Flines and Willem Frederik van der Waard, Delft, Netherlands, assignors, by mesne assignments, to Koninklijke Nederlandse Gist & Spiritusfabrieken, a corporation of the Netherlands
No Drawing. Filed Oct. 15, 1963, Ser. No. 316,462
Claims priority, application Netherlands, Oct. 16, 1962, 284,410
8 Claims. (Cl. 195—51)

It is known that steroids of the 10α-methyl, 9β-series (retro-steroids) and the 10α-methyl, 9α-series (pyro-steroids) have pharcological properties deviating from thase of the 10β-methyl, 9α-series (normal steroids).

It has been proposed to introduce into these retro- or pyro-steroids, in a manner known per se for the normal steroid series, into the steroid skeleton, for example a hydroxy-group at position 16.

In accordance with the invention it has been found that these retro- and pyro-steroids, which have a stereochemical configuration deviating considerably from that of natural steroids, in contrast to logical expectations on the basis of said deviating structure may be subjected to micro-biological conversions. It was found for example that it is possible with the aid of microorganisms or enzyme systems or spores thereof to carry out oxygenations of retro- and pyro-steroids.

It has been found that microorganisms of the family of Moniliaceae are capable of producing an oxygenation at carbon atom 16 of retro- or pyro-steroids.

The invention relates to a method of producing steroids oxygenated at position 16 with the aid of microorganisms of the family of Moniliaceae and as characterized in that a 10α-methyl steroid containing two hydrogen atoms at carbon atom 16 is subjected to the axygenating action of enzyme systems of a microorganism of the family of Moniliaceae or of the spores thereof.

The starting substance may contain various substituents, for example, one or more etherified or non-etherified or esterified hydroxy-groups, one or more keto-oxygen atoms, one or more alkyl-groups with one to six carbon atoms, which may be unsaturated, one or more halogen atoms, e.g., Cl, Br or F. There may be hydroxy groups for example at the positions 1, 2, 3, 6, 11, 17 or 21 (however not in the 17α-position), keto oxygen atoms at the positions 3, 11 and/or 20 and alkyl groups, such as ethyl-, methyl- or allyl-groups at the positions 1, 2, 4, 6 or 17 (however in the latter case not in the β-position in conjunction with a 17α-hydroxy-group). The starting substances may furthermore contain one or more double bonds, for example on the basis of the carbon atoms 1, 2, 3, 4, 5, 6, 14 or 17. In the method according to the invention use is preferably made of starting substances in which a 3-keto-$\Delta^4$-, 3-keto-$\Delta^{4,6}$- or a 3-hydroxy-$\Delta^5$-system or systems functionally derived therefrom are found, for example ethers or esters.

The 10α-methyl-steroids oxygenated at position 16 are important starting products for the synthesis of other 10α-methyl-steroids with a pharmacological activity, which have at position 16 a different functional group, which can be introduced by substituting or reacting with the 16-hydroxy- or 16-keto-group, for example an alkyl-group, an amino-group, a halogen atom.

Suitable starting substances are retro-progesterone, 6-dehydro-retro-progesterone and pyro-progesterone. Suitable are also steroids containing at position 17 a β-bonded hydroxy-group, for example retro-testosterone or 17α-alkyl-retro-testosterone.

It should be noted that with the introduction of a hydroxy-group at position 16 said group is probably orientated in α-position.

The microorganisms which are suitable for use in accordance with the invention, belong to the family of the Moniliaceae, associated with the order of the Moniliales. This order belongs to the class of the Fungi Imperfecti.

Particularly favourable results have been obtained with Moniliaceae microorganisms of the genus of Sepedonium. This classification corresponds to that published in "Dictionary of the Fungi," by G. C. Ainsworth and G. R. Bisby, edition of The Commonwealth Mycological Institute, Kew Surrey, England, 1961.

Among the species yielding satisfactory results in accordance with the invention there may be mentioned: *Sepedonium ampullosporum* Damon and *Sepedonium chrysosperum* (Bull.) Fr Boedyn, Particularly the microorganism *Sepedonium ampullosporum* yielded very high results (80%) with the 16-hydroxylation of 20-keto-retro-pregnanes, among others with 6-dehydro-retro-progesterone. In connection herewith it should be noted that the same microorganisms converts the normal (10β-methyl, 9α) 5β-pregnane-3,11,20-trione only for about 20% into the corresponding 16-hydroxy-steroid.

The method according to the invention is carried out in a manner similar to known microbiological conversions, for example by contacting the substrate under suitable conditions with a culture of a fungus as mentioned above and/or enzyme systems thereof. To this end, for example, first a culture of the fungus is caused to develop under aerobic conditions in a nutrient solution, after which their fermentation medium containing the steroid to be oxygenated, which can be added in a solution or a suspension, is subjected to the oxybiontic dissimilation activity of the formed mycelium. The nutrient solution consists mainly of a carbon source and a nitrogen source, for example a carbohydrate such as glucose, maltose or starch and an organic nitrogent source such as corn steep liquor or yeast extract, protein hydrolysates, amino acids or an inorganic nitrogen source, for example ammonium salts or alkaline metal nitrates.

To the medium containing the steroid to be oxygenated and one or more of the aforesaid nutrient sources may, if desired, be added an anti-foam agent for example glyceryl monostearate. The pH of the medium may be adjusted in a conventional manner and is preferably brought to a value between 6 and 7.

The most suitable fermentation temperature usually lies between 20° C. and 28° C., although higher or lower temperatures between 15° C. and 35° C. are also suitable, in general.

The time required for the oxidation of the steroid may vary between wide limits, but usually an oxgenating period of 10 to 48 hours is an optimum period for complete conversion. The 16α-hydroxy-steroid compounds obtained after the termination of the oxygenating process may be separated of the medium and/or the mycelium in any of the conventional manners, preferably by extraction with organic solvents not miscible with water, such as diethylether, ethylacetate, amylacetate, methylisobutylketone or other esters and ketones. Particularly methylisobutylketone is a suitable extraction agent. The oxygenated steroid may also be isolated from the fermentation medium and purified by chromatographic methods, if desired in conjunction with extraction.

In accordance with the invention the 16-hydroxy-steroids may also be formed by causing spores of the said microorganisms to react with solutions or dispersions of the starting steroids mentioned above.

The following examples may explain the invention further.

EXAMPLE I

*Conversion of retro-progesterone into 16α-hydroxy-retro-progesterone*

A nutrient solution containing 10 gms. of inspissated corn steep liquor and 10 gms. of glucose in 500 mls. of distilled water was inoculated, after the adjustment to a pH value of 6.8 with the aid of an aqueous 2 N-sodium hydroxide solution and after sterilisation at a temperature of 120° C. for 20 minutes, with a culture of *Sepedonium ampullosporum*, grown on oats agar. This culture was shaken in a shaking flask of 2 litres for 24 hours at 26° C. on a rotating shaking machine (250 rev./min.), after which the mycelium mixture obtained was transferred to a stainless steel fermentation tank of 100 litres, comprising an agitator and an aerator, and containing the following fermentation medium, sterilised under the aforementioned conditions:

Corn steep liquor (calculated on the dry substance) _____ gms__ 300
Glucose _____ gms__ 250
Glyceryl monostearate _____ gms__ 30
Tap water _____ litres__ 40
pH=6.8 (sodium hydroxide solution).

To this fermentation medium was added, under aseptic conditions 12.5 gms. of retro-progesterone, suspended in 200 mls. of sterile water, after which fermentation took place for 36 hours at 26° C. (speed 140 rev./min., supply of air: 0.9 m.³/m.² of bottom surface per minute).

The filtrate of the culture (39.4 litres) was then extracted three times with 8 litres of methylisobutylketone. The total extract was evaporated in vacuum to 1 litre, then washed with aqueous sodium hydroxide solution and water and treated with activated carbon. The inspissated extract thus treated was concentrated after filtration in vacuo to 100 mls. Thus 9.7 gms. of crystalline precipitate was obtained, which was identified to be 16α-hydroxy-retro-progesterone. The crystallisate was recrystallised from 50 mls. of methanol-water (2:1), so that 9.54 gms. of white crystalline final product having a melting point of 172.5 to 174.5° C. was obtained.

$(\alpha)_D^{20}$: −92.3° (c.=1, chloroform).

Ultraviolet absorption spectrum in methanol:

$$\lambda_{max}\ 244\ m\mu\ (\epsilon=16,900)$$

Elementary analysis: C, 76.17%; H, 9.21%.
Calculated for $C_{21}H_{30}O_3$: C, 76.32%; H, 9.15%.

From the mother liquors was furtheremore obtained 0.7 gm. of pure product by evaporation to dryness and recrystallisation.

EXAMPLE II

*Conversion of 6-dehydro-retro-progesterone into 6-dehydro-16α-hydroxy-retro-progesterone*

A medium consisting of 20 gms. of casein hydrolysate, 10 gms. of yeast extract, 20 gms. of glucose, 5 gms. of corn steep liquor (calculated on the dry substance) and 2 gms. of primary ammonium phosphate was brought to 1000 mls. with water and then the value of the pH was raised to 6.1 with 2 N-sodium hydroxide.

10 litres of said medium was sterilised and then inoculated with a culture of *Sepedonium chrysospermum* and was then incubated for 36 hours, whilst stirring, at a temperature of 28° C. and 13 litres of sterile air per minute was passed through the fermentation mixture. To the full-grown culture was then added a solution of 6.0 gms. of 6-dehydro-retro-progesterone in 250 mls. of acetone, which mixture was again incubated for 48 hours at a temperature of 28° C., whilst stirring and passing through air.

The mycelium was then separated from the liquid, after which the filtrate was extracted four times with 2000 mls. of methylisobutylketone. The collected extracts were evaporated in vacuo to 800 mls., then washed with a sodium bicarbonate solution and water and finally treated with activated carbon. The filtered extract was then concentrated in vacuo to 35 mls., after which 4.59 gms. of crystalline product was filtered off. The mother liquor was evaporated to dryness and the residue was recrystallised twice from an acetone-heptane mixture (1:1). 0.477 gm. of crystallistate was obtained.

The collected crystallisates were recrystallised twice, each time from 45 mls. of methanol-water (2:1), so that 4.71 gms. of the product was obtained, which could be identified to be pure 6-dehydro-16α-hydroxy-retro-progesterone. Melting point 204–205° C.

$(\alpha)_D^{20}$: −528° (c.—1, chloroform).

Ultraviolet absorption spectrum in methanol:

$$\lambda_{max}\ 286\ m\mu\ (\epsilon=26,800)$$

Elementary analysis: C, 76.85%; H, 8.49%.
Calculated for $C_{21}H_{28}O_3$: C, 76.79%; H, 8.59%.

EXAMPLE III

*Conversion of 6-dehydro-retro-progesterone into 6-dehydro-16α-hydroxy-retro-progesterone*

To a 24-hour culture of *Sepedonium ampullosporum* in 500 litres nutrient medium containing 5 kgs. of corn steep liquor (calculated on the dry substance) and 0.5% of glucose was added 250 gms. of 6-dehydro-retro-progesterone in 5 litres of acetone. The fermentation liquid was incubated at 24° C. under the conditions described in Example I for 60 hours.

After the interruption of the fermentation the mycelium was separated by centrifugal force from the culture liquid. Both the mycelium and the culture liquid were extracted three times from 60 litres of methylisobutylketone. The extract was processed as described in Example II to obtain a crystalline product. In total 195 gms. of crystalline 6-dehydro-16α-hydroxy-retro-progesterone with a melting point of 203–204° C. was obtained.

$(\alpha)_D^{20}$: −520° (c.=1, chloroform).

U.V. absorption spectrum in methanol:

$$\lambda_{max}\ 286\ m\mu\ (\epsilon=26,800)$$

EXAMPLE IV

*Conversion of retro-testosterone into 16-hydroxy-retro-testosterone*

20 cultures of *Sepedonium chrysospermum* of 1000 mls. each in 2-litre Erlenmeyer glass flasks were shaken for 48 hours on a rotating shaking machine (300 rev./min.) at 26° C. The medium employed was adjusted to a pH value of 6.2 by 2 N aqueous sodium hydroxide solution and contained the following constituents:

Inspissated corn steep liquor (calculated on the dry substance) _____ 1
Cane molasses _____ 2
Casein hydrolysate _____ 0.5
Primary ammonium phosphate _____ 0.2
Sodium acetate _____ 0.1

Then the fermentation mixture was transferred to a fermentation trough of stainless steel of 50 litres, comprising an agitator and an aerator, after which 4 gms. of retro-testosterone, dissolved in 300 mls. of acetone was introduced. After 56 hours of cultivation at 26° C. (speed of 140 rev./min., air supply 15 l./min.) the fermentation liquid was separated from the mycelium and the filtrate was extracted three times with 4 litres methylisobutylketone. The total extract was evaporated in vacuo to 750 mls., washed with a sodium carbonate solution and water and finally treated with activated carbon. The solution was then concentrated in vacuo to 90 mls. From said concentrate, after cooling, 2.9 gms. of crystalline product was separated out. The mother liquor was evaporated to dryness and the residue was dissolved, whilst heated, in a mixture of 4 mls. of acetone and 4 mls. of heptane. After cooling 0.120 gm. of crystallisate was obtained therefrom. The total product was recrystallised from 45 mls. of methanol-water (2:1), so that 2.85 gms. of pure 16α-hydroxy-retro-testosterone was obtained, having the following constants:

Melting point 210–212° C.
$(\alpha)_D^{20}$: —164° (c.=1, chloroform).
U.V. absorption spectrum in methanol:

$$\lambda_{max} \ 242 \ m\mu \ (\epsilon=16,700)$$

Elemetnary analysis: C, 74.75%; H, 9.30%.
Calculated for $C_{19}H_{28}O_3$: C, 74.96%; H, 9.27%.

What is claimed is:

1. A method of producing 10α-methyl steroids oxygenated at the 16 position comprising subjecting a 10α-methyl steroid having two hydrogen atoms at the 16 carbon atom and being free of a 17α-hydroxyl, selected from the group consisting of 3-keto-$\Delta^4$-10α-methyl steroids, 3-keto-$\Delta^{4,6}$-10α-methyl steroids, 3-hydroxy-$\Delta^5$-10α-methyl steroids and functional derivatives thereof in the 3 position, to the action of a microorganism selected from the group consisting of the developmental stages of the Sepedonium species, the oxygenating enzyme systems thereof and the spores thereof, and recovering said 10α-methyl steroids oxygenated at the 16 position.

2. The method of claim 1, wherein said microorganism is *Sepedonium ampullosporum*.

3. The method of claim 1, wherein said microorganism is *Sepedonium chrysospermum*.

4. The method of claim 1, wherein said starting 10α-methyl steroid has a 10α-methyl, 9β-H configuration.

5. A method of producing 16α-hydroxy-retro-progesterone comprising subjecting retro-progesterone to the action of a microorganism selected from the group consisting of the developmental stages of *Sepedonium ampullosporum*, the oxygenating enzyme systems thereof, and the spores thereof, and recovering said 16α-hydroxy-retro-progesterone.

6. A method of producing 16α-hydroxy-6-dehydro-retro-progesterone comprising subjecting 6-dehydro-retro-progesterone to the action of a microorganism selected from the group consisting of the developmental stages of *Sepedonium chrysospermum*, the oxygenating enzyme systems thereof, and the spores thereof, and recovering said 16α-hydroxy-6-dehydro-retro-progesterone.

7. A method of producing 16α - hydroxy-6-dehydro-retro-progesterone comprising subjecting 6-dehydro-retro-progesterone to the action of a microorganism selected from the group consisting of the developmental stages of *Sepedonium ampullosporum*, the oxygenating enzyme systems thereof, and the spores thereof, and recovering said 16α-hydroxy-6-dehydro-retro-progesterone.

8. A method of producing 16α-hydroxy-retro-testosterone comprising subjecting retro-testosterone to the action of a microorganism selected from the group consisting of the developmental stages of *Sepedonium chrysospermum*, the oxygenating enzyme systems thereof, and the spores thereof, and recovering said 16α-hydroxy-retro-testosterone.

References Cited by the Examiner

UNITED STATES PATENTS 3,007,950  11/1961  Tonken et al. ____ 260—397.45
3,011,951  12/1961  Murray et al. _____ 195—51

A. LOUIS MONACELL, *Primary Examiner.*

D. M. STEPHENS, *Assistant Examiner.*